United States Patent
St-Pierre et al.

(10) Patent No.: US 6,627,338 B2
(45) Date of Patent: Sep. 30, 2003

(54) INTEGRATED FUEL CELL AND PRESSURE SWING ADSORPTION SYSTEM

(75) Inventors: Jean St-Pierre, Vancouver (CA); David P. Wilkinson, North Vancouver (CA); David S. Wainwright, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 218 days.

(21) Appl. No.: 09/746,856

(22) Filed: Dec. 21, 2000

(65) Prior Publication Data

US 2001/0049037 A1 Dec. 6, 2001

Related U.S. Application Data

(60) Provisional application No. 60/171,365, filed on Dec. 22, 1999.

(51) Int. Cl.[7] .......................... H01M 8/00; H01M 8/18; H01M 8/04; H01M 8/12
(52) U.S. Cl. ........................ 429/13; 429/19; 429/25
(58) Field of Search ........................ 429/12, 13, 17, 429/19, 25; 95/105, 136, 143

(56) References Cited

U.S. PATENT DOCUMENTS

| | | | |
|---|---|---|---|
| 4,565,685 A | * | 1/1986 | Cassano .................. 423/210.5 |
| 4,968,329 A | | 11/1990 | Keefer .......................... 55/25 |
| 5,175,061 A | | 12/1992 | Hildebrandt et al. .......... 429/16 |
| 5,846,295 A | * | 12/1998 | Kalbassi et al. ............... 95/105 |
| 5,912,424 A | * | 6/1999 | Judkins et al. ................ 95/143 |
| 5,925,322 A | | 7/1999 | Werth .......................... 429/170 |
| 5,935,726 A | | 8/1999 | Chow et al. ................... 429/13 |
| 5,972,077 A | * | 10/1999 | Judkins et al. ................ 95/136 |

FOREIGN PATENT DOCUMENTS

| | | |
|---|---|---|
| EP | 0 345 908 | 12/1989 |
| EP | 0 878 859 | 11/1998 |
| JP | 9-190830 | 7/1997 |
| WO | WO 00/16425 | 3/2000 |

\* cited by examiner

*Primary Examiner*—Randy Gulakowski
(74) *Attorney, Agent, or Firm*—McAndrews, Held & Malloy, Ltd.

(57) ABSTRACT

An integrated fuel cell and pressure swing adsorption system is disclosed for operating a solid polymer fuel cell on an enriched reactant stream. The fuel and/or oxidant streams may be enriched; for example, air and reformate streams may be oxygen and hydrogen enriched, respectively. The system may advantageously combine periodic reversal of the reactant flows through the fuel cell with use of an integrated pressure swing adsorption system.

37 Claims, 4 Drawing Sheets

PRIOR ART

INTEGRATED FUEL CELL AND PRESSURE SWING ADSORPTION SYSTEM

CROSS-REFERENCE TO RELATED APPLICATION

This application relates to and claims priority benefits from U.S. Provisional Patent Application Serial No. 60/171,365 filed Dec. 22, 1999, which is incorporated by reference herein in its entirety.

FIELD OF THE INVENTION

The present invention relates to fuel cell systems operating on reactant streams that have been enriched by a pressure swing adsorption method. In particular, the present invention relates to solid polymer electrolyte fuel cell systems operating on oxygen enriched air or hydrogen enriched reformate.

BACKGROUND OF THE INVENTION

Fuel cell systems are currently being developed for use as power supplies in numerous applications, such as automobiles and stationary power plants. Such systems offer promise of economically delivering power with environmental and other benefits.

Fuel cells convert reactants, namely fuel and oxidant, to generate electric power and reaction products. Fuel cells generally employ an electrolyte disposed between two electrodes, namely a cathode and an anode. A catalyst typically induces the desired electrochemical reactions at the electrodes. Preferred fuel cell types include solid polymer electrolyte fuel cells that comprise a solid polymer electrolyte and operate at relatively low temperatures.

A broad range of reactants can be used in solid polymer electrolyte fuel cells. For example, the fuel stream may be substantially pure hydrogen gas, a gaseous hydrogen-containing reformate stream, or methanol in a direct methanol fuel cell. The oxidant may be, for example, substantially pure oxygen or a dilute oxygen stream such as air.

During normal operation of a solid polymer electrolyte fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The catalysts are preferably located at the interfaces between each electrode and the adjacent electrolyte.

Solid polymer electrolyte fuel cells employ a membrane electrode assembly ("MEA"), which comprises the solid polymer electrolyte or ion-exchange membrane disposed between the two electrodes. Separator plates, or flow field plates for directing the reactants across one surface of each electrode, are disposed on each side of the MEA.

Each electrode contains a catalyst layer, comprising an appropriate catalyst, located next to the solid polymer electrolyte. The catalyst may, for example, be a metal black, an alloy or a supported metal catalyst, for example, platinum on carbon. The catalyst layer typically contains ionomer that may be similar to the ionomer used for the solid polymer electrolyte (for example, Nafion®). The catalyst layer may also contain a binder, such as polytetrafluoroethylene. The electrodes may also contain a substrate (typically a porous electrically conductive sheet material) that may be employed for purposes of reactant distribution and/or mechanical support.

In operation, the output voltage of an individual fuel cell under load is generally below one volt. Therefore, in order to provide greater output voltage, numerous cells are usually stacked together and are connected in series to create a higher voltage fuel cell stack. (End plate assemblies are typically placed at each end of the stack to hold it together and to compress the stack components together. Compressive force is generally needed for effecting seals and making adequate electrical contact between various stack components.) Fuel cell stacks can then be further connected in series and/or parallel combinations to form larger arrays for delivering higher voltages and/or currents.

Difficulties may arise with the management of water in a solid polymer fuel cell. For instance, in order to function properly, the ion exchange membrane needs to remain adequately hydrated. However, the inlet reactant streams as supplied may be relatively dry and thus may dry out the membrane in the vicinity of the reactant inlets. Thus, one or both inlet reactant streams may need to be humidified. On the other hand, a substantial amount of product water may be generated at the cathode as a result of the electrochemical reaction therein which can result in flooding downstream in the cathode flow field plate thereby obstructing access of oxidant to the cathode catalyst. As described in U.S. Pat. No. 5,935,726, it may therefore be advantageous to periodically reverse the flow direction of a reactant stream, in particular the oxidant stream, to reduce the likelihood of forming overly wet and overly dry regions in the fuel cell and to reduce or eliminate the need for external humidification of the reactant streams.

For greater output voltages, it is also advantageous to supply fuel cells with concentrated reactant streams and preferably with pure reactant streams (for example, pure hydrogen and oxygen reactants). This is an advantage because the presence of relatively large amounts of non-reactive components in the reactant streams can significantly increase kinetic and mass transport losses in the fuel cells. However, in many applications it may be impractical to store and provide the desired reactants in pure form. For instance, hydrogen gas may be stored in high pressure cylinders, liquefied in a cryogenic container, or alloyed in a metal hydride alloy. Such storage options can all add substantial weight and cost to a fuel cell system. In a like manner, options for storing and providing oxygen gas (for example, in high pressure cylinders or cryogenic containers) also add cost and weight. Instead, hydrogen is frequently obtained by reforming a supply of methanol, natural gas, or the like, on-site or on-board. However, a significant amount of carbon dioxide is also generated in the reforming and it typically becomes a substantial non-reactive component in the reformed fuel stream. Oxygen is typically obtained from the air surrounding the fuel cell system. However, non-reactive nitrogen then typically becomes the major component in the dilute oxidant stream.

Increasing the concentration of the reactant in reformed fuel and/or air streams, that is, enrichment, has thus been considered in the art as a way of improving fuel cell performance. Several enrichment methods are commonly known that involve separating out a component from the reactant stream, including cryogenic, membrane, and pressure swing adsorption methods. In a cryogenic method, component separation is achieved by preferentially condensing a component out of a gaseous stream. In a membrane method, component separation is achieved by passing the stream over the surface of a membrane that is selectively permeable to a component in the stream. In a pressure swing adsorption method, a gas component is separated from a gas stream by preferential adsorption onto a suitable adsorbent under pressure. (The ability of a suitable adsorbent to adsorb a desired gas component is dependent on the partial pressure of that component but also may be dependent on the nature of and partial pressure of any other components present since these other components may also be adsorbed to some extent and/or may interact with the desired component.) The adsorbed component is then subsequently desorbed by reducing the pressure and is removed. By exposing the adsorbent to cyclic swings in pressure, a cyclical adsorption and desorption takes place at the adsorbent, and saturation of the adsorbent may be prevented. The gas stream remaining over the adsorbent (that is, the raffinate) is enriched in the component or components that are not adsorbed by the adsorbent. The gas stream that is later desorbed from the adsorbent (that is, the extract) is enriched in the component that was adsorbed by the adsorbent. Thus, an enriched stream may be derived from either the raffinate or the extract.

In a pressure swing adsorption system however, the desired enriched stream is only provided during one part of the two part pressure swing cycle. Thus, a pressure swing adsorption system typically comprises two portions (or more) of adsorbent in order to provide a continuous stream of enriched gas. The system is operated such that the two adsorbent portions adsorb and desorb the gas component out of phase with each other (that is, one adsorbent portion adsorbs while the other adsorbent portion desorbs during operation). At any given time, enriched raffinate may thus be obtained from the adsorbing portion. Alternatively, at any given time, enriched extract may be obtained from the desorbing portion.

Apparatus for providing an enriched gas stream via pressure swing adsorption typically comprises two chambers, one for each adsorbent portion, and associated plumbing and controls for alternately pressurizing and depressurizing the two chambers and for suitably directing the flow of raffinates, extracts, and the supplied gas stream in a prescribed sequence. In previously described fuel cell applications, pressure swing adsorption apparatus has been incorporated as a separate subsystem between a dilute reactant stream supply (typically a fuel reformate or compressed air supply) and a fuel cell stack or array.

SUMMARY OF THE INVENTION

The present methods and systems for enriching reactants for fuel cells employ an integrated pressure swing adsorption apparatus. The pressure swing adsorption method may involve swings in the absolute pressure of a reactant stream or swings in the partial pressure of a reactant stream component or both. Further, temperature swings may also be employed to assist in the adsorption/desorption process.

The operational features of certain fuel cells (for example, solid polymer fuel cells) make them more amenable to integration with pressure swing adsorption apparatus. For instance, fuel cells that normally operate at reactant pressures well above ambient (for example, greater than about 138 kPa (20 psig)) are readily adapted to be able to provide pressure swings of order of the difference between operating pressure and ambient. Such pressure differences may be suitable for useful enrichment via pressure swing adsorption. Thus, means for pressurizing the reactant streams for purposes of pressure swing adsorption and for supply to the fuel cells may be integrated and simplified.

Further, fuel cells that are normally supplied with significant excess reactant (that is, where more reactant is supplied to the fuel cells than is consumed therein) may have a ready supply of somewhat enriched "waste" reactant exhaust that can be used for purposes of desorbing and subsequently pressurizing adsorbent in the pressure swing apparatus. For instance, often a significant excess of oxidant may be supplied to the fuel cells. The oxidant stoichiometry (that is, the ratio of the amount of oxidant supplied to that actually consumed in the electrochemical reactions in the cell) may significantly exceed 1 (for example, typically from about 1.5 to 2 in solid polymer fuel cells). Thus, in such an instance, there may be a significant supply of still-enriched oxidant exhaust which may be available to desorb or to augment desorption of adsorbent in the pressure swing apparatus.

Further still, the enrichment method may involve reversing the flow of the reactant stream through the reactant passages in the fuel cells. Thus, the advantages obtained with the use of periodic flow reversal in the fuel cells can conveniently be achieved in combination with reactant enrichment.

Generally, since pressure swing adsorption is more effective at lower temperatures, fuel cell types with relatively lower operating temperature are preferred for purposes of integration with pressure swing adsorption apparatus. Thus, fuel cell systems such as solid polymer fuel cell and alkaline fuel cell systems, with operating temperatures below about 200° C., are preferred.

An embodiment of an integrated fuel cell and pressure swing adsorption system comprises the following: at least one fuel cell, a pressurized reactant stream supply comprising a reactant and a non-reactant, and a reactant stream line comprising first and second valves upstream and downstream of the fuel cell and providing a fluid connection through the reactant stream passages of the at least one fuel cell. In this embodiment, the reactant stream line thus provides a path for the reactant stream to flow from the first valve, through the fuel cell passages, and to the second valve and vice versa. The pressurized supply is fluidly connected to both the first and the second valves, and the first and second valves are operative to open and close the reactant stream line between the pressurized supply and the fuel cell. Thus, flow from the pressurized supply can be directed to the fuel cell in either direction through the reactant stream line. The first and second valves may also be operative to vent the reactant stream line thereby providing vents in either flow direction for reactant exhaust from the fuel cell. Additionally, the functions of the first and second valves may be incorporated into a single complex valve that is capable of directing multiple fluid streams.

Embodiments of the fuel cell system may also comprise first and second adsorbent portions for the non-reactant. The adsorbent portions are accessed by the reactant stream in the reactant stream line and may be located external or internal to the fuel cell. The first adsorbent portion may be located either between the first valve and the fuel cell or within the fuel cell itself. The second adsorbent portion may be located between the second valve and the first adsorbent portion. Thus, the sequence of the elements in the reactant stream line of such embodiments is: a first valve, a first adsorbent portion, a second adsorbent portion, and a second valve. The fuel cell is located between the first and second valves in the reactant stream line.

A method for enriching a gaseous reactant stream in the preceding integrated fuel cell and pressure swing adsorption system comprises: alternately directing the reactant stream from the reactant stream supply through the first and second valves, and when the reactant is directed to the fuel cell via the first valve (a) directing the reactant stream through the first adsorbent portion thereby depleting the reactant stream of the non-reactant and enriching the reactant stream in the reactant, and (b) desorbing the non-reactant from the second adsorbent portion; and when the reactant stream is directed to the fuel cell via the second valve (a) directing the reactant stream through the second adsorbent portion thereby depleting the reactant stream of the non-reactant and enriching the reactant stream in the reactant, and (b) desorbing the non-reactant from the first adsorbent portion.

The fuel cell system may comprise more than one fuel cell stack, for example, a first and second fuel cell stack. The first and second fuel cell stacks may however share common end plate and compression mechanisms. With two fuel cell stacks, the method may then further comprise: directing the enriched reactant stream through the reactant stream passages of the first fuel cell stack (but not necessarily through the reactant stream passages of the second fuel cell stack) when the reactant stream is directed to a fuel cell through the first valve, and directing the enriched reactant stream through the reactant stream passages of the second fuel cell stack (but not necessarily through the reactant stream passages of the first fuel cell stack) when the reactant stream is directed to a fuel cell through the second valve. The desorbing of the non-reactant from either or both of the first and second adsorbent portions may be accomplished by reducing the pressure of the reactant stream to ambient in the first and/or second adsorbent portions, respectively (that is, desorption involves a substantial swing in absolute pressure and hence in partial pressure). Preferably, energy is recovered from the pressurized gas in the adsorbent portion as the pressure is reduced to ambient. For instance, gas from an adsorbent portion may be used to drive a turbocompressor as it is vented to ambient.

Alternatively, or in addition, as long as the partial pressure of the non-reactant in the reactant stream exhaust from the fuel cell stack is significantly less than that in the reactant stream supply, the desorbing of the non-reactant may be accomplished by directing the reactant stream exhaust from a fuel cell stack through the adsorbent portions (that is, desorption involves a substantial swing in partial pressure of the adsorbed species but not necessarily a substantial swing in absolute pressure). For instance, the desorbing of the non-reactant from the first adsorbent portion may be accomplished by directing the reactant stream exhaust from the second fuel cell stack through the first adsorbent portion. In a like manner, the desorbing of the non-reactant from the second adsorbent portion may be accomplished by directing the reactant stream exhaust from the first fuel cell stack through the second adsorbent portion. Optionally, both techniques may be employed. For example, the desorbing from each adsorbent portion may involve venting to ambient pressure and purging using the reactant stream exhaust from one of the fuel cell stacks. Such desorbing may be achieved by incorporating additional valve(s) between the two fuel cell stacks in which the valve(s) is operative to vent the reactant stream line and/or to fluidly connect the reactant passages of the two stacks together.

The two adsorbent portions may be located external to the fuel cell stack or stacks. Alternatively, the adsorbent portions may be located within the stack or stacks themselves. For instance, in embodiments comprising two stacks, the first adsorbent portion may be interposed between the first valve and the first fuel cell stack and the second adsorbent portion may be interposed between the second valve and the second cell stack. Alternatively, the first and second adsorbent portions may be located within the first and second fuel cell stacks respectively. In a system consisting of only a single fuel cell, the two adsorbent portions may be located within that fuel cell. In such a case, the adsorbent portion nearest one end of the reactant passage(s) may be adsorbing non-reactant while the adsorbent portion nearest the other end of the reactant passage(s) may be desorbing non-reactant. There need not be a distinct boundary defining a separation between the first and second adsorbent portions (for example, an embodiment comprising a single fuel cell in which adsorbent is distributed along the reactant passage).

There are various locations within a fuel cell stack that are accessible to the reactant stream and thus may be suitable locations for an adsorbent. For instance, the adsorbent portions may be arranged in sub-stacks of their own, thereby forming adsorbent sub-stacks. Alternatively, the adsorbent portions may be arranged in individual adsorbent layers in which an adsorbent layer is associated with one or more membrane electrode assemblies in the fuel cell stacks. Further, the adsorbent portions may be located within the reactant stream manifolds or passages of the fuel cell stacks. In general, because the presence of water may reduce the selectivity of an adsorbent, it may be beneficial to reduce contact between water and the adsorbent by incorporating hydrophobic layers between any adsorbent portions and the reactant stream.

An adsorbent may also be located within a fuel cell stack in or near the cell electrodes. For instance, the adsorbent portions may be located in gas diffusion or porous electrode substrate layers or in sublayers (catalyst support layers) of the membrane electrode assemblies in the fuel cell stacks. Alternatively, the adsorbent portions may be located in catalyst layers of the membrane electrode assemblies. This might be achieved by simply mixing particulate adsorbent with the catalyst in the catalyst layers, or by employing a suitable adsorbent as a support for the catalyst in the catalyst layers. For example, an activated carbon or carbon molecular sieve that selectively adsorbs nitrogen may be considered as such a catalyst support.

In embodiments comprising two fuel cell stacks, the first and second adsorbent portions may be located in a like manner in each of the first and second fuel cell stacks respectively, or not.

The desorbing step in the pressure swing adsorption cycle need not include a venting of the adsorbent to ambient pressure. Desorbing may instead be accomplished by flowing exhaust from a fuel cell stack through the adsorbent portion to be regenerated. This approach may not involve a large absolute pressure swing between adsorption and desorption, but there may still be a substantial partial pressure swing. For instance, an embodiment may be considered wherein the fuel cell system comprises a fuel cell stack in which the first adsorbent portion is interposed between the first valve and the fuel cell stack and the second adsorbent portion is interposed between the second valve and the fuel cell stack. In this embodiment, during adsorption, an adsorbent is directly exposed to the pressurized reactant stream supply, which may have a substantial partial pressure of non-reactant. During desorption, that adsorbent is directly exposed to the still somewhat enriched exhaust from the fuel cell stack which has a substantially lower partial pressure of non-reactant compared to the reactant stream supply. Compared to the reactant stream entering the fuel cell stack, the enriched exhaust will of course be somewhat depleted of reactant.

The method and apparatus may be useful for enriching either or both of an oxidant reactant stream and a fuel reactant stream. For instance, an oxygen enriched reactant stream may be obtained from a pressurized supply of air or a hydrogen enriched reactant stream may be obtained from a pressurized supply of reformate.

DETAILED DESCRIPTION OF PREFERRED EMBODIMENT(S)

Figure 1:
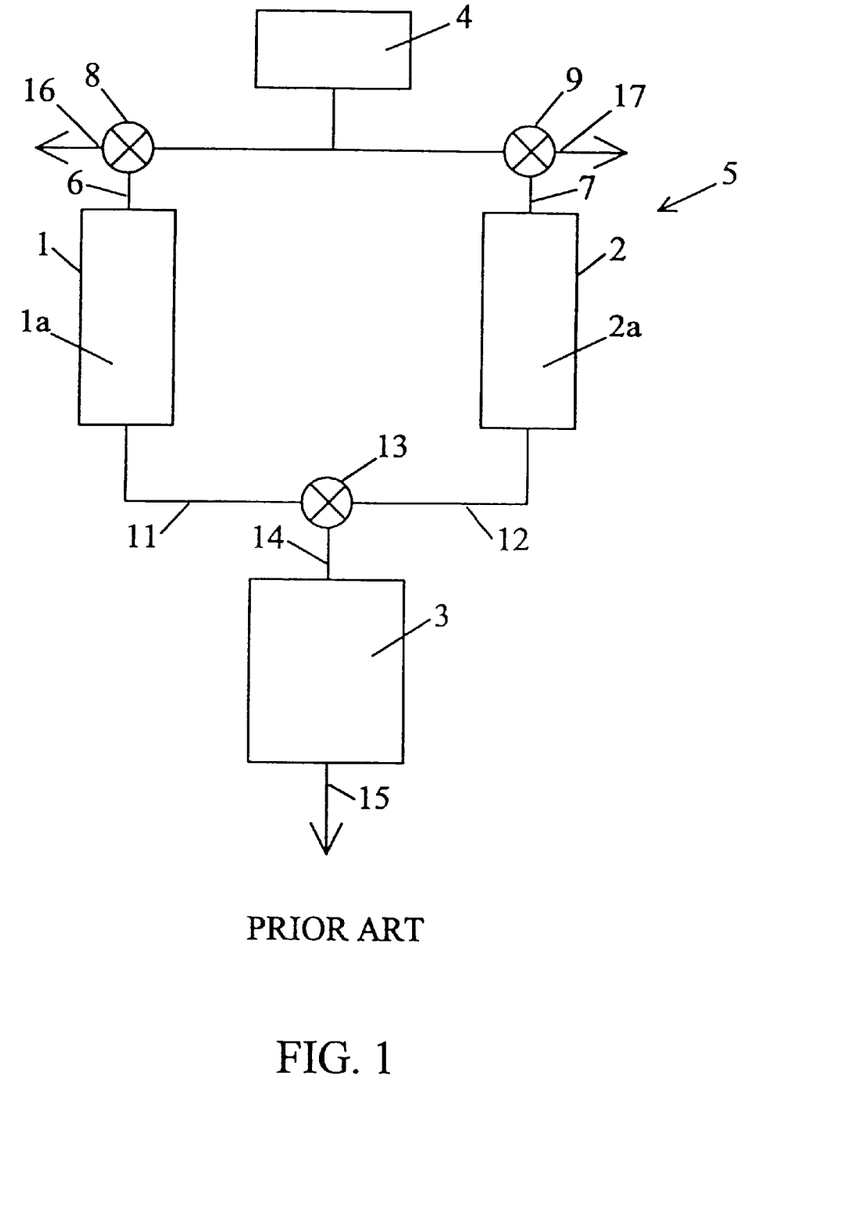
FIG. 1 is a schematic diagram of a prior art solid polymer fuel cell stack and pressure swing adsorption system.

A schematic diagram of a prior art solid polymer fuel cell stack and pressure swing adsorption system is depicted in FIG. 1. Fuel cell stack 3 is supplied with a pressurized reactant stream from supply 4. Before entering fuel cell stack 3, the reactant stream is enriched using pressure swing adsorption (PSA) apparatus 5 which comprises two chambers 1, 2 containing two adsorbent portions 1a, 2a respectively. In part of the PSA cycle, the pressurized reactant stream is directed from supply 4 by valve 8 to adsorbent chamber 1 via line 6. Adsorbent 1a preferentially adsorbs non-reactant from the reactant stream and thus a pressurized, reactant enriched stream (the raffinate) is directed through line 11. At least some of the reactant enriched stream is then directed by valve 13 to fuel cell stack 3 via line 14. After flowing through the fuel cell passages, an exhaust reactant stream is vented from fuel cell stack 3 via line 15. Typically, the pressure drop of the reactant stream through the fuel cell stack 3 is relatively small (approximately a few tenths of a bar) and thus it may still be significantly pressurized relative to ambient. In the case of the oxidant, the exhaust oxidant stream is typically used to drive a turbo-compressor (employed in the system to provide the initial supply of compressed oxidant) thereby recovering some of the energy used to provide the oxidant reactant supply. In the case of the fuel, the exhaust fuel stream is typically directed to a burner that can be used to provide heat somewhere in the system (for example, to a reformer). During this part of the PSA cycle, adsorbent 2a in adsorbent chamber 2 is desorbed of non-reactant (the extract). The pressure in chamber 2 may first be reduced by venting chamber 2 to ambient via line 17 by valve 9. Then, a "purge" of chamber 2 may optionally be accomplished by employing valve 13 to also direct a minor portion of the enriched stream from line 11 through line 12. The purge also vents out line 17. Near the end of this part of the PSA cycle, valve 9 may be closed and chamber 2 may be pressurized with the enriched stream from lines 11 and 12 such that pressurized reactant stream may be available immediately from chamber 2 later in the PSA cycle. This avoids an interruption in the supply of enriched reactant to fuel cell stack 3 and hence in power generation.

At an appropriate time in the PSA cycle, the flows are changed in PSA apparatus 5. The pressurized reactant stream now is directed from supply 4 by valve 9 to adsorbent chamber 2 via line 7. Adsorbent 2a preferentially adsorbs non-reactant from the reactant stream and thus a pressurized, reactant enriched stream is now directed through line 12. Again, at least a portion of the reactant enriched stream is directed by valve 13 to fuel cell stack 3 via line 14. Meanwhile, adsorbent 1a in adsorbent chamber 1 is now desorbed. The pressure in chamber 1 may similarly be reduced by venting to ambient via line 16 by valve 8. Then, a purge of chamber 1 may be accomplished by using valve 13 to also direct a minor portion of the enriched stream from line 12 through line 11 and vent out line 16. Chamber 1 may then be pressurized prior to changing the flows again.

An alternative arrangement (not shown) to the prior art solid polymer fuel cell stack and pressure swing adsorption system depicted in FIG. 1 uses an adsorbent for the reactant instead of the non-reactant in the reactant stream supply. In this arrangement, the extract is supplied to the fuel cell stack instead of the raffinate. The valve(s) and venting lines in the PSA apparatus are modified accordingly. However, in this arrangement, the reactant enriched stream (extract) is obtained during the desorption phase in the PSA cycle. Since the desorbing is carried out at lower pressure, either recompression of the extract may be required before supplying it to the fuel cell stack or higher starting reactant stream supply pressures may be required, and thus this alternative arrangement is not generally preferred.

Figure 2:
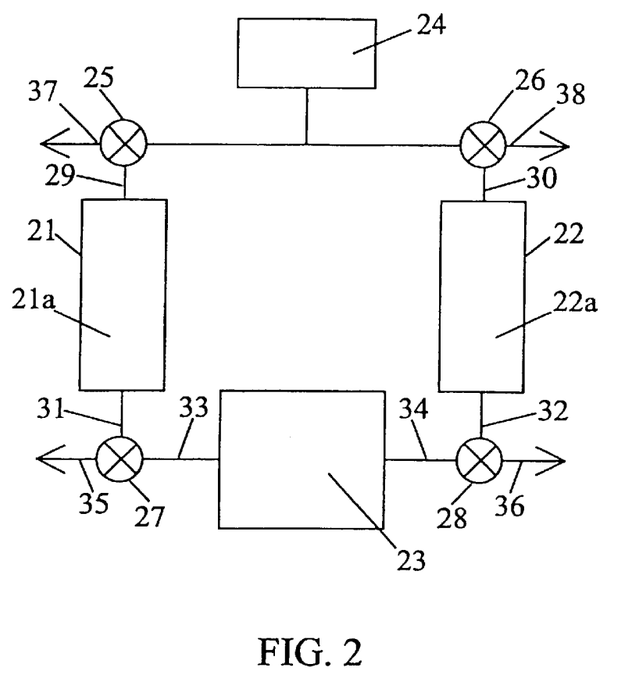
FIG. 2 is a schematic diagram of an integrated solid polymer fuel cell stack and pressure swing adsorption system.

FIG. 2, on the other hand, is a schematic diagram of an integrated solid polymer fuel cell stack and pressure swing adsorption system. Here, fuel cell stack 23 is supplied with a pressurized reactant stream from supply 24. In part of the PSA cycle, the pressurized reactant stream is directed from supply 24 by first valve 25 to adsorbent chamber 21 (containing first adsorbent portion 21a) via line 29. A pressurized, reactant enriched stream is obtained at line 31 and is directed by valve 27 to fuel cell stack 23 via line 33. After flowing through the fuel cell passages, the exhaust reactant stream is directed through line 34 and is either vented via line 36 (possibly to drive a turbo-compressor or to supply a burner) or directed via line 32 to purge adsorbent chamber 22 by valve 28. (As in certain conventional systems, part of the exhaust stream may also be recirculated and fed back into the fuel cell stack again if desired.)

During the initial desorption phase of adsorbent 22a in adsorbent chamber 22, the pressure may be reduced by venting to ambient via lines 30 and 38 using second valve 26 (again possibly driving a turbo-compressor or the like during venting). Thereafter, adsorbent chamber 22 may be purged using a portion of the exhaust reactant stream from line 34. (During purging, it is desirable not to allow the pressure in line 34 to drop abnormally, otherwise the performance of fuel cell stack 23 could be adversely affected. This can be accomplished by directing an appropriate portion of the exhaust reactant stream in line 34 to line 32 via valve 28. Near the end of this part of the PSA cycle, second valve 26 can be closed thereby allowing pressure to build in chamber 22 prior to reversing the flow of the reactant stream.) The pressure swing employed in the adsorption/desorption process is thus derived from the pressure drop that exists between the reactant stream supply and ambient.

Alternatively, the absolute pressure in chamber 22 can instead be maintained close to the pressure in line 34 during the entire desorption process by purging chamber 22 with the exhaust reactant stream from line 34. The exhaust reactant stream will be somewhat depleted of reactant compared to the inlet reactant stream at line 33. However, the exhaust reactant stream may still be sufficiently enriched relative to the supply gas from supply 24 for the purpose of effecting desorption in chamber 22. In this way, a pressure swing may be achieved, without as much of a swing in absolute pressure, via the difference in partial pressures between the original reactant stream supply and the fuel cell exhaust. (In certain circumstances, it may be useful to avoid large swings in absolute pressure. For instance, certain adsorbents like microporous silica are subject to attrition as a result of repeated exposure to large cyclic swings in absolute pressure. Thus, the lifetime of such adsorbents might be extended by reducing the magnitude of the swing in absolute pressure during adsorption/desorption.)

At an appropriate time in the PSA cycle, the flows are changed in FIG. 2. The pressurized reactant stream now is directed from supply 24 to adsorbent chamber 22 via line 30 through second valve 26 and a pressurized, reactant enriched stream is now obtained at line 32. The reactant enriched stream is directed by valve 28 to fuel cell stack 23 via line 34. Meanwhile, adsorbent 21a in adsorbent chamber 21 is desorbed in a similar manner to adsorbent 22a in the preceding. The pressure in chamber 21 may similarly be reduced by venting to ambient via line 37 using first valve 25, and/or a purge of chamber 21 may be accomplished by using valve 27 to direct a portion of the exhaust reactant stream from fuel cell stack 23 at line 33 through line 31 and ultimately venting out line 37. Again, pressure can be allowed to build in chamber 21 near the end of this part of the PSA cycle by closing valve 25.

The embodiment in FIG. 2 offers several advantages over that of the prior art illustrated in FIG. 1. For instance, the portion of the reactant stream that is used for purging is directed through the fuel cell stack first and thus may be used initially to generate useful power. The fuel cell stack exhaust, which has unused excess reactant therein, may then be used as purge for desorbing purposes (except during any initial depressurizing phase of desorption and subsequent repressurizing). Further, the flow direction of the reactant stream in this integrated fuel cell stack and pressure swing adsorption apparatus is periodically reversed. Thus, the advantages of flow reversal or switching as described in U.S. Pat. No. 5,935,726 may be obtained. Generally, these advantages are achieved by configuring the apparatus such that a reactant stream line is defined having first and second valve 25 and 26 at each end which provides a fluid connection through the reactant stream passages of the fuel cells in the fuel cell stack 23.

Figure 3:
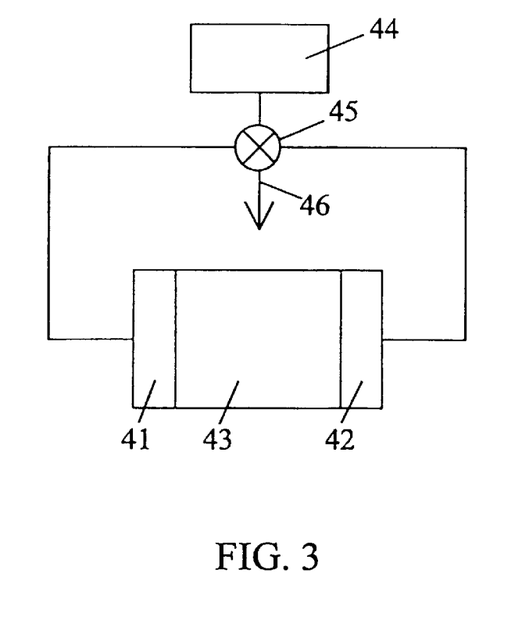
FIG. 3 is a schematic diagram of another embodiment of an integrated solid polymer fuel cell stack and pressure swing adsorption system.

FIG. 3 is a schematic diagram of an alternative embodiment of an integrated solid polymer fuel cell stack and pressure swing adsorption system. Fuel cell stack 43 is supplied with a pressurized reactant stream from supply 44. In part of the PSA cycle, the pressurized reactant stream is directed from supply 44 by valve 45 to adsorbent chamber 41 which is directly attached to fuel cell stack 43. A pressurized, reactant enriched stream is obtained and directed from chamber 41 through fuel cell stack 43. After flowing through the fuel cell flow passages, the exhaust reactant stream is directed out through adsorbent chamber 42, which is also directly attached to fuel cell stack 43 and then through line 46. The exhaust reactant stream thus purges and desorbs the adsorbent in adsorbent chamber 42 immediately after exiting fuel cell stack 43. In the next part of the PSA cycle, the flow is reversed. The adsorbents in this embodiment are not vented to ambient pressure during the desorption phase and thus do not experience a large absolute pressure swing. Instead, the embodiment in FIG. 3 relies on a pressure swing arising from the difference in partial pressure between the supplied and the enriched exhaust stream for purposes of desorption. The magnitude of this partial pressure difference, and hence the suitability of this embodiment, will depend in part on the operating stoichiometry of the fuel cell stack and the extent of enrichment by the adsorbents. As shown in FIG. 3, valve 45 is a complex valve incorporating the functions of valves 25 and 26 in FIG. 2.

Figure 4:
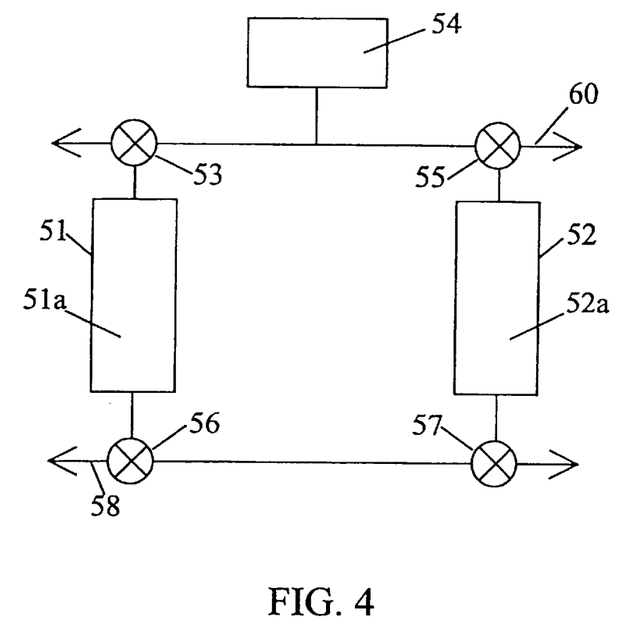
FIG. 4 is a schematic diagram of another embodiment of an integrated solid polymer fuel cell stack and pressure swing adsorption system that comprises two separate fuel cell stacks.

FIG. 4 is a schematic diagram of an alternative embodiment of an integrated solid polymer fuel cell stack and pressure swing adsorption system that comprises two separate fuel cell stacks. Here, two fuel cell stacks 51 and 52 each contain an adsorbent portion 51a and 52a respectively located so as to be accessible by the reactant stream to be enriched. In part of the PSA cycle, pressurized reactant stream is directed from supply 54 by first valve 53 to fuel cell stack 51 containing adsorbent portion 51a. Here, enrichment occurs within fuel cell stack 51 itself. The exhaust reactant stream from fuel cell stack 51 is directed by valve 56 either to vent via line 58 (again possibly to drive a turbo-compressor or to supply a burner) or to be directed to purge adsorbent 52a in fuel cell stack 52 by valve 57.

During the initial desorption phase of adsorbent 52a in fuel cell stack 52, the pressure may be reduced by venting to ambient via line 60 using second valve 55. Thereafter, adsorbent 52a may be purged using a portion of the exhaust reactant stream from fuel cell stack 51. Some power output may be obtained from fuel cell stack 52 during purging albeit at a lower level since the reactant stream passing through its reactant passages will be enriched in non-reactant relative to the reactant in stack 51. (Again, during purging, it is desirable not to allow the pressure at the outlet of fuel cell stack 51 to drop abnormally, otherwise its performance could be adversely affected. This can be accomplished by directing an appropriate portion of the exhaust reactant stream to fuel cell stack 52 via valves 56 and 57. Near the end of this part of the PSA cycle, second valve 55 can be closed thereby allowing pressure to build in fuel cell stack 52 prior to reversing the flow of the reactant stream.) At an appropriate time in the PSA cycle, the flows are changed in FIG. 4 and a similar sequence is repeated.

In FIG. 4, the two fuel cell stacks 51 and 52 appear to be physically separated. However, both stacks may be combined into a single unit by sharing common endplate and compression mechanisms. The two stacks need only differ in construction with respect to the plumbing to their reactant flow passages.

Figure 5A:
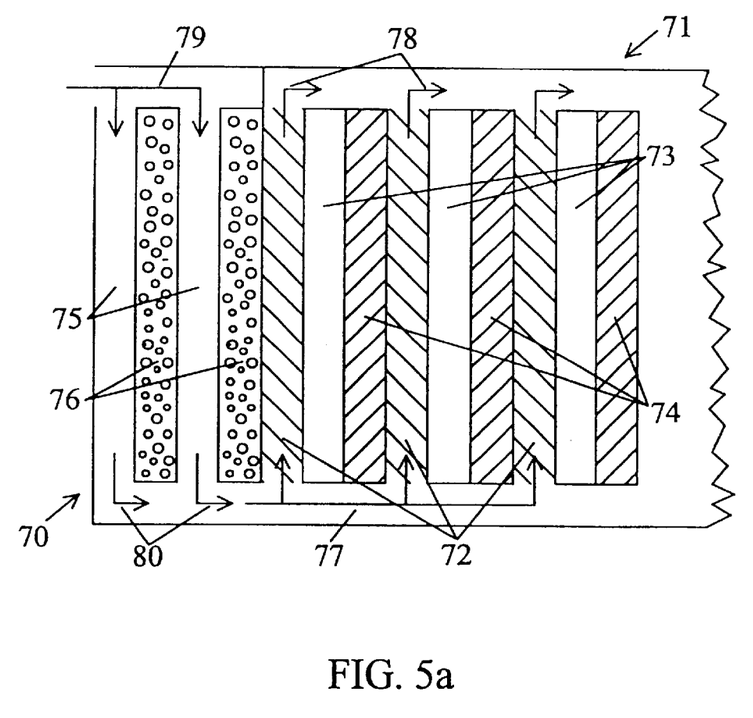
FIGS. 5a and b are schematic diagrams of a solid polymer fuel cell in which adsorbent has been incorporated in different ways.
Figure 5B:
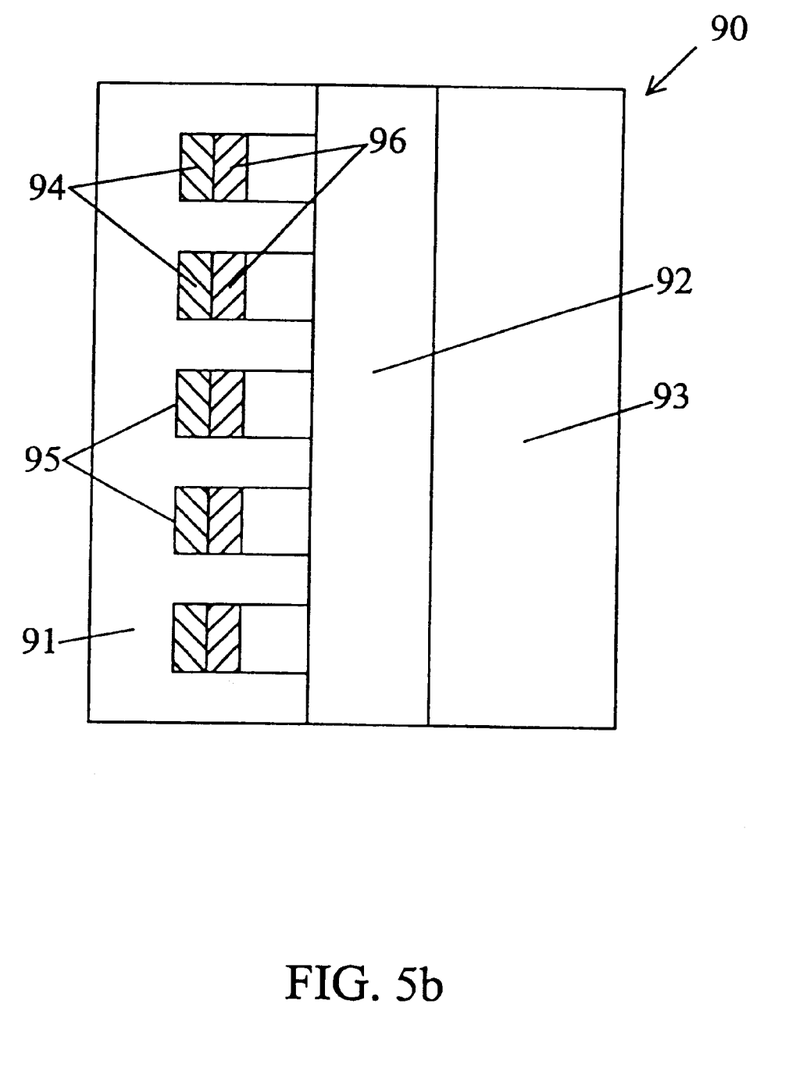

The adsorbent portions in FIG. 4 are located within fuel cell stacks and should be accessible to the reactant stream. FIGS. 5a and b schematically illustrate two possible suitable ways of incorporating adsorbent within a solid polymer fuel cell stack. In the cross-sectional view of FIG. 5a, an adsorbent portion is incorporated within fuel cell stack 71 in the form of an adsorbent sub-stack 70. Fuel cell stack 71 comprises a stack of fuel cell units each comprising a first reactant flow field plate 72, a membrane electrode assembly (MEA) 73, and a second reactant flow field plate 74. Each MEA 73 comprises an anode, a solid polymer electrolyte membrane, and a cathode (not shown). First and second reactant gases are directed through passages which contact the adjacent electrode in flow field plates 72 and 74 respectively (the flow direction of the first reactant gas being indicated by inlet arrows 77 and outlet arrows 78). Adsorbent sub-stack 70 comprises a stack of adsorbent units each comprising a flow field plate 75 (which may be similar to those in the fuel cell stack) and an adjacent layer containing adsorbent 76. The reactant stream to be enriched (the first reactant stream in FIG. 5a) is initially directed through the passages in flow field plates 75 in adsorbent stack 70 at inlet arrows 79 whereupon non-reactant is adsorbed by adsorbent 76. The enriched first reactant stream exits flow field plates 75 at outlet arrows 80 and then is directed to first reactant fuel cell flow field plates 72.

FIG. 5b shows a cross-sectional view of another embodiment incorporating adsorbent within the fuel cell stack. Here, the fuel cell stack comprises a stack of fuel cell units 90 each comprising a first reactant flow field plate 91, an MEA 92, and a second reactant flow field plate 93. Adsorbent 94 is contained within gas distribution channels 95 formed in first reactant flow field plate 91. The flow direction of the reactant stream in FIG. 5b is perpendicular to the plane of the figure.

Solid polymer fuel cell stacks generate water at the cathode and typically require substantial levels of water in the membrane. Thus, there is usually a significant water content throughout the interior of such operational stacks. However, adsorbents may lose effectiveness in the presence of water if water, particularly liquid water, is preferentially adsorbed. Non-polar type adsorbents (that is, with hydrophobic surfaces) may be used to reduce this problem. Examples of non-polar type adsorbents include surface treated activated carbons (in which surface oxygen groups have been removed), microporous silica with hydrophobic surface groups, and silicalite zeolite (having low aluminum content, for example silica to aluminum ratios of approximately 1000). Alternatively, polar-type adsorbents that are sensitive to water might also be contemplated in the wet environment of the fuel cell stack if water is kept away from the adsorbent. For this purpose in FIG. 5b, a hydrophobic layer 96 (for example, microporous Goretex™ polytetrafluoroethylene layer) is shown covering adsorbent 94 in gas distribution channels 95 and protecting adsorbent 94 from contacting liquid water in channels 95. If the adsorbents are located external to the fuel cell stacks (for example, as in FIG. 2), it may be desirable to incorporate water knock-out drums between the fuel cell stacks and the adsorbent portions to protect the latter from contacting liquid water.

Adsorbent may also be incorporated within a fuel cell stack in individual adsorbent layers each associated with one or more MEAs. For instance, the fuel cell stack may comprise a stack of fuel cell units including a layer containing an adsorbent, two reactant flow field plates, and an MEA. The reactant stream to be enriched is directed into the appropriate flow field plate whereupon non-reactant is adsorbed at the adsorbent. Concurrently, the enriched reactant stream accesses the relevant electrode in the MEA. Eventually, the reactant stream exits the flow field plate. Here, the reactant stream is continually being enriched as it flows through the flow field plates and thus the extent of enrichment varies throughout. As a result, adsorbent nearest the inlet of the fuel cell stack will adsorb more non-reactant than will adsorbent nearest the exhaust of the fuel cell stack. When the flow and hence the pressure drop of the reactant stream through the flow field plates is reversed, adsorbent nearest what is now the inlet will adsorb more non-reactant and adsorbent nearest what is now the exhaust will desorb non-reactant.

Other ways of incorporating adsorbent within a fuel cell stack may be contemplated. For instance, a suitable adsorbent may be located in the electrodes in the MEAs. Where applicable, this might be accomplished by distributing adsorbent in electrode substrates or gas diffusion layers or by distributing adsorbent in the electrode catalyst layers. In the latter case, particulate adsorbent might simply be mixed in with catalyst particles in the catalyst layers. Alternatively, the adsorbent may actually serve as a support for the catalyst (wherein catalyst particles are first deposited onto larger adsorbent particles that in turn are used to fabricate electrodes). To be a suitable support however, the adsorbent should be electrically conductive, have a high surface area, and not result in contamination of the catalyst. Some carbons used as molecular sieves may be suitable as adsorbents and catalyst supports.

Aside from the modifications required to physically incorporate adsorbent within the fuel cell stack, other modifications may need to be considered as a result of changes in flow velocity and/or water management characteristics. For instance, with adsorbent in the fuel cell stack, fluid flow rates will decrease as non-reactant is adsorbed from the reactant stream and will increase as non-reactant is desorbed and joins the reactant stream. The latter effect can result in a flow velocity increase near the fuel cell stack exhaust and may be advantageous in removing product water. Consideration of these effects may, for example, warrant a change in flow field design (for example, flow field channels of varying width or depth as a function of distance from stack inlets or outlets), in operational conditions, or the like.

Other embodiments of an integrated fuel cell and pressure swing adsorption system may additionally be contemplated. For instance, it may be desirable to use the exhaust reactant stream from the fuel cells in order to desorb non-reactant from the adsorbent portions without additionally reversing the flow of the reactant stream through the fuel cells. This may be accomplished by the appropriate incorporation of additional lines and valve(s) in the embodiment of FIG. 1 such that the fuel cell exhaust stream from line 15 can be directed back to adsorbent chambers 1 and 2 by lines 11 and 12 instead of simply venting the fuel cell exhaust from line 15. Alternatively, even simpler embodiments may be contemplated if enrichment is desired primarily during brief operating periods (for example, during startup when the fuel cells are below normal operating temperature, or where greater or peak power output is temporarily desired, such as when accelerating in an automotive application). For example, a single adsorbent portion may be integrated in the fuel cell system with a by-pass line provided such that the reactant stream may normally be directly supplied to the fuel cell but, for brief periods when desired, may be directed instead over the adsorbent portion and then to the fuel cell. In this case, the adsorbent could be desorbed by venting to ambient pressure during periods of normal operation.

While the preceding description was directed at solid polymer fuel cell types, pressure swing adsorption apparatus can desirably be integrated with other fuel cell types. However, since adsorbents function better at lower temperatures, it is the relatively low temperature fuel cell types such as solid polymer electrolyte fuel cells that are preferred. Adsorption and desorption may be assisted by augmenting the pressure swings with swings in temperature (for example, suitably heating and cooling the adsorbent portions perhaps by appropriate reversal of the flow direction of coolant). In addition, while the preceding embodiments employed two discrete adsorbent portions, more than two adsorbent portions or, alternatively, one continuously distributed portion may also be employed. Further, while the preceding embodiments served to adsorb one non-reactant, more than one non-reactant in a gas stream may be adsorbed by more than one type of adsorbent. Still further, although not preferred, the adsorbent portions need not comprise the same adsorbent.

Integrating a fuel cell system with a pressure swing adsorption system can result in system simplification and provide for more efficient usage of the pressurized reactants. Certain embodiments may also provide for energy savings over conventional alternatives.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method of enriching a reactant stream for a fuel cell system, said reactant stream comprising a reactant and a non-reactant, said fuel cell system comprising at least one fuel cell, a reactant stream line comprising first and second valves at each end and providing a fluid connection through the reactant stream passages of said fuel cell, a pressurized reactant stream supply, and two adsorbent portions for said non-reactant accessible by said reactant stream in said reactant stream line, said method comprising:

alternately directing said reactant stream from said reactant stream supply through said first and second valves;

directing said reactant stream through said first adsorbent portion when said reactant stream is directed through said first valve, thereby depleting said reactant stream of said non-reactant and enriching said reactant stream in said reactant;

desorbing said non-reactant from said second adsorbent portion when said reactant stream is directed through said first valve;

directing said reactant stream through said second adsorbent portion when said reactant stream is directed through said second valve, thereby depleting said reactant stream of said non-reactant and enriching said reactant stream in said reactant; and desorbing said non-reactant from said first adsorbent portion when said reactant stream is directed through said second valve.

2. The method of claim 1 wherein said fuel cell system comprises a first and second fuel cell stack, said method comprising:

directing said enriched reactant stream through the reactant stream passages of said first fuel cell stack when said reactant stream is directed through said first valve; and directing said enriched reactant stream through the reactant stream passages of said second fuel cell stack when said reactant stream is directed through said second valve.

3. The method of claim 2 wherein said first and second fuel cell stacks share common end plate and compression mechanisms.

4. The method of claim 2 wherein said desorbing of said non-reactant from said first adsorbent portion comprises reducing the pressure of said reactant stream to ambient in said first adsorbent portion and wherein said desorbing of said non-reactant from said second adsorbent portion comprises reducing the pressure of said reactant stream to ambient in said second adsorbent portion.

5. The method of claim 4 wherein said desorbing of said non-reactant from said first adsorbent portion comprises directing said reactant stream from said second fuel cell stack through said first adsorbent portion following said reducing of said reactant stream pressure in said first adsorbent portion and wherein said desorbing of said non-reactant from said second adsorbent portion comprises directing said reactant stream from said first fuel cell stack through said second adsorbent portion following said reducing of said reactant stream pressure in said second adsorbent portion.

6. The method of claim 5 wherein said first adsorbent portion is interposed between said first valve and said first fuel cell stack and wherein said second adsorbent portion is interposed between said second valve and said second cell stack.

7. The method of claim 5 wherein said first and second adsorbent portions are located within said first and said second fuel cell stacks respectively.

8. The method of claim 7 wherein said first and second adsorbent portions comprise first and second adsorbent stacks in said first and second fuel cell stacks, respectively.

9. The method of claim 7 wherein said first and second adsorbent portions comprise adsorbent plate assemblies associated with each membrane electrode assembly in said first and second fuel cell stacks, respectively.

10. The method of claim 7 wherein said first and second adsorbent portions are located within the reactant stream passages of said first and second fuel cell stacks, respectively.

11. The method of claim 7 additionally comprising at least one hydrophobic layer interposed between said adsorbent portions and said reactant stream.

12. The method of claim 7 wherein said first and second adsorbent portions are located in gas diffusion layers of the membrane electrode assemblies in said first and second fuel cell stacks, respectively.

13. The method of claim 7 wherein said first and second adsorbent portions are located in reactant stream manifolds in said first and second fuel cell stacks, respectively.

14. The method of claim 7 wherein said first and second adsorbent portions are located in catalyst layers of the membrane electrode assemblies in said first and second fuel cell stacks, respectively.

15. The method of claim 14 wherein said first and second adsorbent portions are mixed with the catalyst in said catalyst layers.

16. The method of claim 14 wherein the catalyst in said catalyst layers of the membrane electrode assemblies in said first and second fuel cell stacks is supported on said first and second adsorbent portions, respectively.

17. The method of claim 16 wherein the adsorbent in said first and second adsorbent portions is selected from the group consisting of an activated carbon and a carbon molecular sieve.

18. The method of claim 1 wherein said first adsorbent portion is interposed between said first valve and said fuel cell, and said second adsorbent portion is interposed between said second valve and said fuel cell.

19. The method of claim 1 wherein said reactant stream pressure is greater than about 138 kPa.

20. The method of claim 1 wherein the reactant stoichiometry is greater than about 1.5.

21. The method of claim 1 wherein said fuel cell operates at a temperature less than about 200° C.

22. The method of claim 1 wherein said reactant is an oxidant.

23. The method of claim 1 wherein said reactant is a fuel.

24. The method of claim 1 wherein said fuel cell is a solid polymer electrolyte fuel cell.

25. A reactant enriched fuel cell system comprising:
at least one fuel cell;
a pressurized reactant stream supply comprising a reactant and a non-reactant; a reactant stream line comprising first and second valves located upstream and downstream, respectively, of said fuel cell and providing a fluid connection through the reactant stream passages of said fuel cell, said pressurized supply fluidly connected to both said first and said second valves, and said first and second valves operative to open and close said reactant stream line between said pressurized supply and said fuel cell;

a first adsorbent portion for said non-reactant accessible by said reactant stream in said reactant stream line; and a second adsorbent portion for said non-reactant accessible by said reactant stream in said reactant stream line between said second valve and said first adsorbent portion.

26. The fuel cell system of claim 25 wherein said first and second valves are operable to vent said reactant stream line, thereby providing vents for exhausting reactant from said fuel cell.

27. The fuel cell system of claim 25 additionally comprising a multifunctional valve that comprises said first and second valves.

28. The fuel cell system of claim 25 comprising a first and a second fuel cell stack.

29. The fuel cell system of claim 28 comprising at least one additional valve interposed between said first and second fuel cell stacks, said at least one additional valve being operable to vent said reactant stream line.

30. The fuel cell system of claim 28 comprising at least one additional valve fluidly connecting the passages of the first and second fuel cell stacks.

31. A method of enriching a reactant stream for a fuel cell system, said system comprising a pressurized reactant stream supply comprising a reactant and a non-reactant, a pressure swing adsorption apparatus comprising an adsorbent for said non-reactant, and a fuel cell, said method comprising:

directing said reactant stream supply to said adsorbent in said pressure swing adsorption apparatus during the adsorption part of the pressure swing cycle; and directing the reactant stream exhaust from said fuel cell to said adsorbent in said pressure swing adsorption apparatus during the desorption part of the pressure swing cycle.

32. A reactant enriched fuel cell system comprising:

a pressurized reactant stream supply comprising a reactant and a non-reactant;

a pressure swing adsorption apparatus comprising an adsorbent for said non-reactant wherein said adsorbent is fluidly connected to said pressurized reactant stream supply apparatus during the adsorption part of the pressure swing cycle; and a fuel cell wherein the reactant stream exhaust from said fuel cell is fluidly connected to said adsorbent during the desorption part of the pressure swing cycle.

33. A method of enriching a reactant stream for a fuel cell system over a portion of an operating period, said system comprising a pressurized reactant stream supply comprising a reactant and a non-reactant, an adsorbent for said non-reactant, and a fuel cell, said method comprising:

directing said reactant stream supply over said adsorbent and then to said fuel cell during said portion of said operating period;

directing said reactant stream supply directly to said fuel cell after said portion of said operating period; and desorbing said adsorbent after said portion of said operating period.

34. The method of claim 33 wherein said adsorbent is desorbed by venting to ambient pressure after said operating period.

35. The method of claim 33 wherein said portion of said operating period comprises the start-up period associated with said fuel cell.

36. The method of claim 33 wherein said portion of said operating period comprises a peak power operating period associated with said fuel cell.

37. A fuel cell system with temporary reactant enrichment comprising:

a pressurized reactant stream supply comprising a reactant and a non-reactant;

a fuel cell;

a reactant stream line fluidly connecting said pressurized reactant stream supply to said fuel cell;

an adsorbent for said non-reactant in said reactant stream line;

a by-pass line fluidly connected to said reactant stream line across said adsorbent; and a vent line fluidly connected to said adsorbent.

* * * * *